(12) United States Patent
Lynn et al.

(10) Patent No.: US 6,387,175 B1
(45) Date of Patent: May 14, 2002

(54) ROADWAY BASE INTERMEDIATE, ROADWAY BASE, AND METHODS OF MANUFACTURE

(75) Inventors: John D. Lynn, Center Valley, PA (US); Leah M. Burge, Hobart, IN (US); Douglas J. Koutek, Valparaiso, IN (US); John L. Sullivan, Michigan City, IN (US)

(73) Assignees: Bethlehem Steel Corporation, Bethlehem, PA (US); Environmental Recycling Technologies, Inc., Chesterton, IN (US)

( * ) Notice: Subject to any disclaimer, the term of this patent is extended or adjusted under 35 U.S.C. 154(b) by 13 days.

(21) Appl. No.: 09/680,095

(22) Filed: Oct. 5, 2000

(51) Int. Cl.⁷ .......................... E01C 3/00; C04B 18/14; C04B 18/30; C08L 95/00; C09D 195/00
(52) U.S. Cl. ................. 106/790; 106/671; 106/707; 106/714; 75/770; 75/771; 75/773; 404/31
(58) Field of Search .............................. 106/707, 714, 106/671, 790; 75/770, 771, 773; 404/31

(56) References Cited

U.S. PATENT DOCUMENTS

| | | | |
|---|---|---|---|
| 179,831 A | 1/1876 | Warren | |
| 185,529 A | 9/1876 | Heller | |
| 220,234 A | 10/1879 | Gross | |
| 2,402,597 A | 6/1946 | Bourcier | 94/2 |
| 3,545,348 A | 12/1970 | Anderson | 94/10 |
| 4,101,332 A | 7/1978 | Nicholson | 106/85 |
| 4,105,463 A | 8/1978 | Angelbeck | 106/120 |
| RE30,943 E | 5/1982 | Nicholson | 106/85 |
| 4,373,960 A | 2/1983 | Ward, Jr. | 106/281 R |
| 4,731,120 A | 3/1988 | Tuutti | 106/97 |
| 5,037,480 A | 8/1991 | Baker | 106/816 |
| 5,382,279 A | 1/1995 | Anderson, II | 75/746 |
| 5,478,392 A | 12/1995 | Hooykaas | 106/789 |
| 5,573,576 A * | 11/1996 | Krofchak | 75/773 |
| 5,702,199 A | 12/1997 | Fishback et al. | 404/17 |
| 5,785,737 A | 7/1998 | Lynn et al. | 75/751 |
| 5,885,328 A * | 3/1999 | Markarian et al. | 75/770 |

* cited by examiner

Primary Examiner—David Brunsman

(57) ABSTRACT

A roadway base comprises oily sludge, steelmaking slag fines, and an additive selected from the group consisting of cement, fly ash, asphaltic emulsion, and mixtures thereof

29 Claims, 1 Drawing Sheet

ROADWAY BASE INTERMEDIATE, ROADWAY BASE, AND METHODS OF MANUFACTURE

FIELD OF THE INVENTION

The disclosed invention relates to use of steel mill oily sludges and steelmaking slag fines in the preparation of a material useful in the preparation of a base for roadways, parking lots, walkways, foundations, dikes, railroad tracks and the like. More particularly, the disclosed invention intermixes steel mill oily sludge and steelmaking slag fines through high energy shear mixing in order to create an intermediate material. The intermediate material may thereafter be mixed with pozzolonic binders, such as cement, fly ash, and asphaltic emulsion in order to create a roadway base material that is overlaid onto a sub base. The resulting base exhibits relatively high strength, minimizes cracking due to the "freeze/thaw" cycle, and is able to withstand the long term deleterious effects attributable to high weight trucks and the like traveling over the finished roadway.

BACKGROUND OF THE INVENTION

A typical roadway is formed by preparing the earth by grading, scraping, and the like in order to provide a relatively flat surface upon which the roadway is to be formed. Most roadways have a sub base formed of stabilized sand or soil and a base formed of crushed rock, crushed concrete, or other stabilized materials that support the overlying roadway. Concrete, macadam, and the like overlie the sub base in order to provide the roadway.

A typical roadway is exposed to accumulations of water because of either the proximity of subsurface water or pooling that occurs due to storms, runoff, and the like. The water has a tendency to wash out the soil supporting the base, thus weakening the sub base and its overlying roadway or base. In addition, in those areas subject to the "freeze/thaw" cycle, unacceptable cracking may occur. When a base course cracks, typically because of inflexibility or inelasticity (which is measured by flow), the crack transmits through the surface course. Water then invades the crack. The freeze/thaw cycle expands the crack and leads to early failure of the roadway, parking lot, etc.

Attempts have been made to alleviate the problems attributable to water accumulation, but they have not been successful and frequently are expensive. Similarly, attempts have been made to overcome the problems of the freeze/thaw cycle, but they likewise have not been successful. For example, asphaltic emulsion frequently is applied to the exposed surface of a roadway in an attempt to seal it against moisture. Gravel and other relatively fine materials sometimes are applied to the asphaltic emulsion in order to minimize slickness. Asphaltic emulsion and the application of fine gravel increased the cost of maintaining a roadway, and generally have not been successful.

The disclosed invention meets these and other needs in the art by providing a roadway base that is formed from oily sludge created in a steelmaking plant, and steelmaking slag fines. The oily sludge and slag fines are mixed together in a high energy, shear mixer, and allowed to set for a sufficient period to cause the water in the sludge to hydrate the lime in the slag fines. After the lime has been hydrated, then the resulting intermediate product is mixed with pozzolonic binders, such as cement and fly ash and non-pozzolonic binders such as asphaltic emulsion, and mixtures thereof, in order to provide a base of relatively high strength and increased water resistance which substantially reduces the detriments of the freeze/thaw cycle.

SUMMARY OF THE INVENTION

A roadway base intermediate, according to the invention, comprises oily sludge and steelmaking slag fines.

A roadway base intermediate according to the invention consists essentially of oily sludge and steelmaking slag fines.

According to the invention, a method of preparing a roadway base intermediate comprises the steps of providing a supply of water-containing oily sludge. A supply of lime containing steelmaking slag fines is provided. The oily sludge is then blended with the steelmaking slag fines. The blended oily sludge and slag fines are allowed to react for a period sufficient to hydrate the lime.

A roadway base according to the invention, comprises oily sludge, steelmaking slag fines, and pozzolonic binder selected from the group consisting of cement, and fly ash and non-pozzolonic binders such as asphaltic emulsion, and mixtures thereof.

A method of preparing a roadway base comprises the steps of providing a supply of water-containing oily sludge and a supply of lime-containing, steelmaking slag fines. The sludge and the slag fines are blended. The blended sludge and slag fines are allowed to cure for a period sufficient to hydrate the lime. The hydrated blended sludge and slag fines are mixed with pozzolonic binder selected from the group consisting of cement, and fly ash and non-pozzolonic binders such as asphaltic emulsion, and mixtures thereof These and other objects and advantages of the invention will be readily apparent in view of the following description and drawings of the above-described invention.

BRIEF DESCRIPTION OF THE DRAWINGS

The above and other objects and advantages and novel features of the present invention will become apparent from the following detailed description of the preferred embodiment of the invention illustrated in the accompanying drawings, wherein.

DETAILED DESCRIPTION OF THE PREFERRED EMBODIMENT

Figure 1:
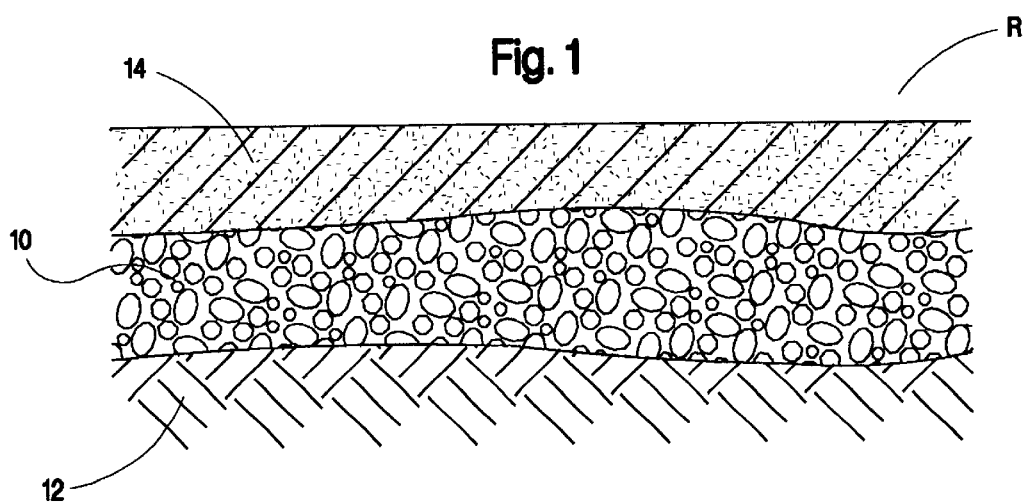
FIG. 1 is a fragmentary cross-sectional view of a roadway incorporating the base of the invention.

Roadway R, as best shown in FIG. 1, includes a base 10 overlying sub base 12. The sub base typically is prepared soil or sand underneath the base course. The sub base 12 may be soil, rock, sand, or any of the various materials, naturally occurring and otherwise, upon which roadways are laid in order to permit traffic by vehicles of all sorts. Overlying the base 10 may be a supplemental roadway 14 formed from cement, macadam, asphalt, and the like. Moreover, while I illustrate the roadway as being formed from base 10 and supplement 14, those skilled in the art will understand that the roadway may be formed from a single base layer 10 or one or more layers 10 and 14 of differing thicknesses, materials, and characteristics.

In the course of manufacturing steel, particularly in an integrated steelmaking environment, oils, greases, hydrocarbons, and similar organic materials mix with water and are eventually communicated to a wastewater treatment plant ("WWTP",). The oils, greases, and hydrocarbons are produced from mill scale, mill sludges and the like, and may accumulate in scale pits prior to being forwarded to the wastewater treatment plant. The wastewater treatment plant typically treats the received oils, greases, hydrocarbons, and water with chemical, and/or biological, and/or filtering and/or dewatering processes. The result is clean water suitable for discharge, and a residual known as oily sludge that needs to be disposed of or reused. Oily sludge typically is about 30 to 35% by weight solids, and includes the oils, organic materials, and hydrocarbons that remain after the waste water treatment processes. The oily sludge is highly viscous and is not very pumpable. The oily sludge typically contains up to 50% by weight water.

Various efforts have been made to utilize oily sludge in steelmaking operations. For example, Anderson, U.S. Pat. No. 5,382,279, the assignee of which is also an assignee hereof and the disclosure of which is incorporated herein by reference, discloses a method for consuming oily sludge by reducing its viscosity and spraying it onto the moving grate of a sinter plant. Markarian, U.S. Pat. No. 5,885,328, discloses a method of combining oily sludge with non-oily steel mill waste in an agglomeration. Other efforts have included the expedient of merely landfilling the oily sludge, but the use of landfilling has decreased, in part, due to environmental concerns. Integrated steelmaking plants produce relatively large quantities of oily sludge, with the result that the disposal of the oily sludge continues to be an issue that needs to be resolved.

Yet another material produced in relatively large quantities by an integrated steelmaking plant is steel slag. During the course of reducing iron to steel in a modern basic oxygen furnace, slag is created in order to maintain bath temperature, remove impurities, and the like. Steelmaking slag is another byproduct that frequently has been landfilled, stockpiled, or marketed for low value uses, such as roadway aggregate. While steelmaking slag does not present the environmental issues of the sort presented by oily sludge, the landfill costs represent yet another cost that increases the cost of steel. Steelmaking slag is relatively rich in iron, lime, and silicon dioxide. Steelmaking slag has a relatively low internal strength, and may be crushed, ground, or otherwise reduced to a relatively small size, on the order of sand, as 5 needed.

Lynn U.S. Pat. No. 5,785,737, the assignee of which is an assignee hereof and the disclosure of which is incorporated herein by reference, discloses a method of combining scrubber sludge with hot slag in order to create a slag/sludge mixture suitable for recycling. Unlike the herein disclosed process, the Lynn patent utilizes hot slag to dehydrate the sludge.

Table I contains an analysis performed on oily sludge and steelmaking slag fines, and provides data about their composition for one integrated steelmaking facility. While each individual steelmaking facility will have its own unique analysis, it is believed that the data in Table I is fairly representative of what would be expected in others.

TABLE I

|  | WWTP Centrifuge Cake | Steelmaking Slag Fines |
|---|---|---|
| Tonnage, DNT/Yr | 18,250 | 171,985 |
| Constituent |  |  |
| Fe | 37.9 | 21.4 |
| C | 7.4 | NA |
| CaO | 9.0 | 46.0 |
| MgO | 1.0 | 5.6 |

TABLE I-continued

|  | WWTP Centrifuge Cake | Steelmaking Slag Fines |
|---|---|---|
| $SiO_2$ | 3.7 | 12.5 |
| $Al_2O_3$ | 2.0 | 1.1 |
| Residuals |  |  |
| P | 0.4 | 0.4 |
| S | 0.1 | NA |
| Cr | <0.03 | " |
| Ni | <0.01 | " |
| Cu | <0.03 | " |
| Pb | 0.03 | NA |
| Zn | 0.1 | " |
| Cd | <0.03 | " |
| $Na_2O$ | 0.1 | NA |
| $K_2O$ | 0.2 | " |
| Mn | NA | 3.5 |
| Oil/Grease | 15.0 | Nil |

We have found that the admixture of oily sludge with steelmaking slag fines provides an intermediate suitable for transformation into a roadway base that overcomes the water accumulation and freeze/thaw problems, and substantially eliminates cracking due to inflexibility and inferior strength. The ratio of sludge to slag fines is from about 0.5:1 to about 1.5:1. The invention converts steel plant solid wastes into valuable raw materials that may be used in road construction. Except for the use of cement, with additions as low as 3% by weight, the remaining materials are solid wastes. Certain cement substitutes can be used, such as power plant and municipal incinerator fly ash and other pozzolanic wastes. Thus, a suitable roadway base can be produced from only industrial solid wastes, thus avoiding the need to consume natural resources.

The invention improves the compressive strength and flexibility of the road construction material. Because the acicular/angular surface of the slag, a stronger bond occurs among the oily fines, cement, and slag aggregate. In most commercial aggregates, the relatively smooth surface creates planes of weakness, and thus a weaker product. Laboratory analysis of the disclosed invention indicated physical properties exceeding state and federal limits for highway base materials. The base material 10 preferably has a 2000 lb. Marshall Stability, a flow within a range of 9 to 16, and a compressive strength of 50 pounds per square in. More preferably, the base has a 6000 lb. Marshall Stability, a flow within a range of 9 to 14, and a compressive strength of 250 pounds per square inch.

The invention hydrates the lime contained in the steelmaking slag fines. The presence of free lime in steelmaking slag is a major impediment to its use as a highway base, because the free lime has inherent expansion properties and causes swelling and heaving in the base that results in subsequent cracking in the concrete/macadam surface course. In the invention, during the mixing/curing stage, the water contained in the oily sludge (up to 50% water) completes the hydration reaction of the lime, thus significantly reducing expansion problems. The resulting material comprises a relatively impermeable concrete-like material that inhibits water penetration and the associated freeze/thaw problems common to highways in cold climates. The hydration of the cement and also the eventual carbonation of the calcium hydroxide results in a hard, substantially impermeable mass, thus further enhancing the strength and impermeability of the base. Additionally, we have found that the contained oil and grease from the oily sludge seals the resulting base material, thus causing it to become hydrophobic and inhibit water infiltration.

Figure 2:
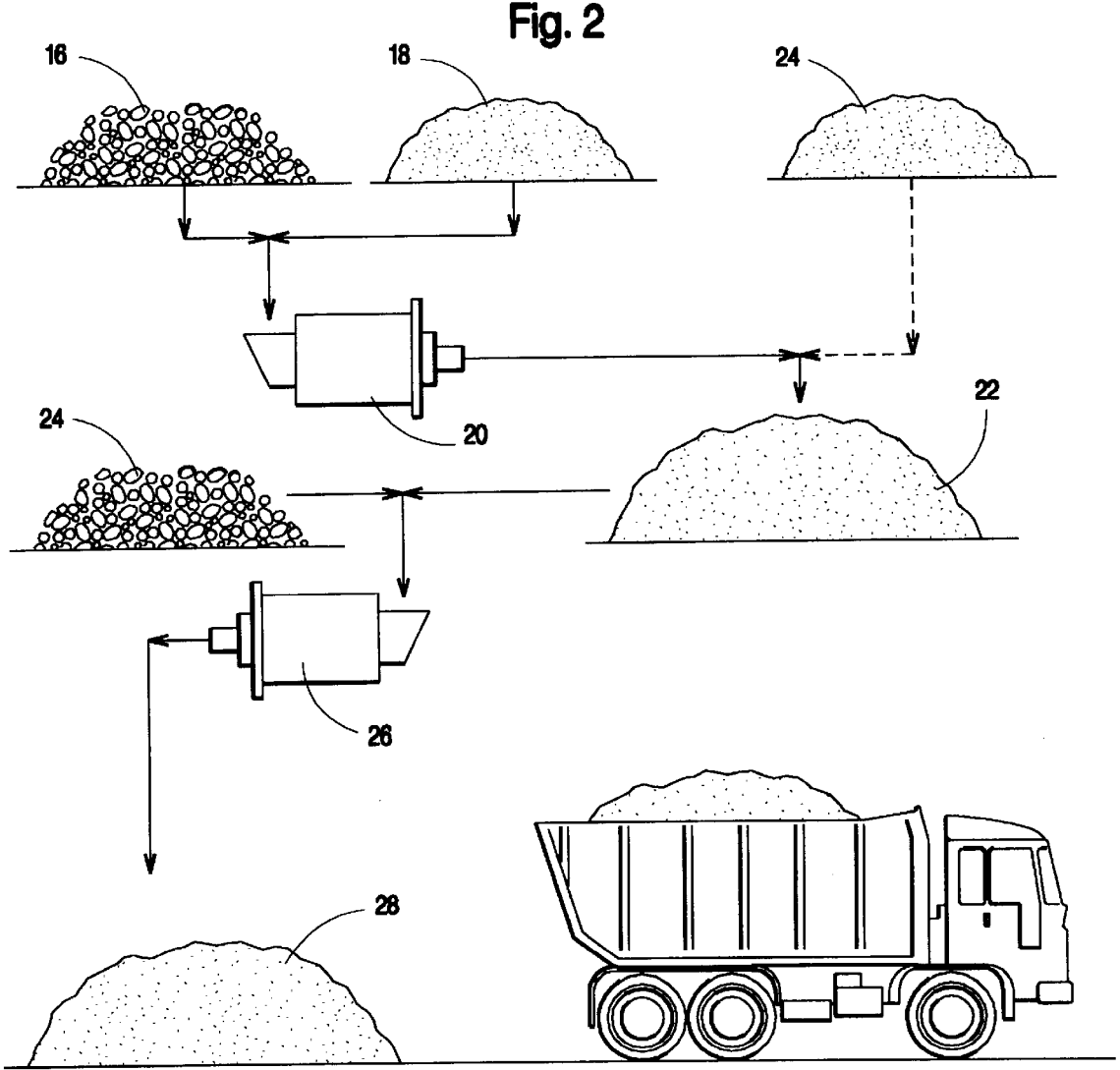
FIG. 2 is a flow chart showing one method of manufacturing the intermediate and resulting base of the invention.

As best shown in FIG. 2, a supply of oily sludge 16 and a supply of steelmaking slag fines 18 are communicated to a high-energy shear mixer 20. We prefer that the slag fines have a screened size less than about 0.5 inches, although other sizes may be used. The high-energy shear mixer mixes the oily sludge and its water with the slag fines, thereby initiating the hydration reaction of the free lime. The high energy mixer, which may include a pug mill, provides sufficient mixing of the oily sludge and the slag fines. The hydration reaction of the oily sludge and steelmaking slag mixture 22 is relatively slow, and may require a cure time of from about one month to about six months. We prefer that the hydration reaction proceed to completion. The presence of free lime in the base material causes expansion on account of the hydration reaction, and subsequent roadway cracking and deterioration. Although the cure time at 22 may be up to six months, the actual time may be shorter and may be determined by periodic expansion tests pursuant to established Department of Transportation regulations, in order to ascertain when the material has met the appropriate requirements.

Once the blended slag and sludge have hydrated the free lime in the mix/cure phase, then one or more additives 24 may be added. Once again, we prefer the use of a high-energy shear mixer 26 in order to mix the additive with the hydrated, blended, oily sludge and slag. Suitable additives include pozzolonic binders such as cement and fly ash and non-pozzolonic binders such as asphaltic emulsion, and mixtures thereof. The hydrated, blended oily sludge and slag and its additive(s) must meet or exceed the standards for Marshall load strength, Flow and Compressive Strength, in order to be suitable for use as a base. The amount of the additives may vary. After the intermediate and additive(s) have been mixed, the resulting material 28 is ready to be applied to the sub base through standard road building procedures.

Where the additive is cement, then we have found that from 0% by weight to about 16% by weight cement additive yields acceptable Marshall loading for roadway base use. The 16% by weight cement addition is comparable to a typical 1:2:3 concrete mix. Fly ash may in certain instances be an acceptable substitute for the cement. Power plant and/or municipal incinerator ash also may be used. The fly ash addition may be from about 0% by weight to about 16% by weight. An asphaltic emulsion may be used to enhance the load bearing strength of the mix. The asphaltic emulsion may range from about 0% by weight to about 10% by weight.

The process involves the initial preparation to mix and ensure complete hydration of the lime, while meeting Federal/state codes for roadway base materials. The blended, hydrated materials may be stockpiled for subsequent use. The additives are added only to the properly cured blend, preferably at the time of preparation of the base material. The base material, once placed on the earth, crushed rock, or the like of the sub base 12 may be compacted and allowed to cure for a minimum of one day to a maximum of about seven days. We prefer that the sub base 12 be about one foot to about two feet thick in order to provide sufficient support for base 10. Once the base and sub base has cured, asphalt, concrete, macadam and/or other typical roadway topcoats, such as chip and seal can be applied.

We prefer that a high energy, shear-type mixer be used to admix the oily sludge and slag fines, and the hydrated, blended slag and sludge with the additive(s). High energy mixing deaggolomerates the oily sludge and provides intimate particle to particle contact. The high energy mixing eliminates pockets of oily sludge within the mix, which could weaken the strength of the road construction material. High energy mixing accelerates the lime hydration reaction. The mixer may be the type that is used for grinding/shredding asphalt or a high energy pug mill. A commercial low energy type pug mill mixer may also be used to blend oily sludge within the mix. However, such low energy mixers are found to be less effective than a high energy mixer. Additionally, the oily sludge mix could be blended using a front end loader, but such mix blending would also be less effective than a high energy mixer.

Table II contains a listing of the results achieved with various base materials produced pursuant to the invention. In the testing reported in Table II, there was a 50:50 ratio of steel slag to sludge. We believe that approximately 35% steel slag is required in order to provide sufficient slag to be hydrated by the available water in the sludge. There should be no more slag than can be hydrated by the available water in the sludge, in order to preclude post-application slag expansion due to hydration resulting from surface water.

TABLE II

PHASE I

| Sample Description | Set | Cure Time | Avg. Max Load | Avg. Flow |
|---|---|---|---|---|
| BOF Slag Fines/SWTP | 1 | 77° F., 24 hrs | 1799 | 10 |
| Sludge Mix with No Additives | 2 | 140° F., 24 hrs. | 1838 | 8 |
| BOF Slag Fines/SWTP | 1 | 77° F., 24 hrs | 2777 | 10 |
| Sludge Mix with 6% Cement | 2 | 140° F., 24 hrs. | 2947 | 15 |
| BOF Slag Fines/SWTP | 1 | 77° F., 24 hrs | 3000 | 8 |
| Sludge Mix with 8% Cement | 2 | 140° F., 24 hrs. | 3067 | 12 |
| BOF Slag Fines/SWTP | 1 | 77° F., 24 hrs | 3000 | 7 |
| Sludge Mix with 10% Cement | 2 | 140° F., 24 hrs. | 3798 | 9 |
| BOF Slag Fines/SWTP | 1 | 77° F., 24 hrs | 2870 | 12 |
| Sludge Mix with 2.5% AES 300 and 12% Cement | 2 | 140° F., 24 hrs. | 3751 | 14 |
| BOF Slag Fines/SWTP | 1 | 77° F., 24 hrs | 3843 | 11 |
| Sludge Mix with 14% Cement | 2 | 140° F., 24 hrs. | 4383 | 14 |
| BOF Slag Fines/SWTP | 1 | 77° F., 24 hrs | 3913 | 10 |
| Sludge Mix with 16% Cement | 2 | 140° F., 24 hrs. | 4943 | 11 |
| BOF Slag Fines/SWTP | 1 | 77° F., 24 hrs | 979 | 15 |
| Sludge Mix with 2.5% AES 300 | 2 | 140° F., 24 hrs. | 932 | 13 |
| BOF Slag Fines/SWTP | 1 | 77° F., 24 hrs | 767 | 17 |
| Sludge Mix with 3.0% AES 300 | 2 | 140° F., 24 hrs. | 952 | 13 |
| BOF Slag Fines/SWTP | 1 | 77° F., 24 hrs | 663 | 19 |
| Sludge Mix with 3.5% AES 300 | 2 | 140° F., 24 hrs. | 782 | 17 |

The samples of Table II were soaked for 6 days in water with no visible signs of swelling or deterioration.

While this invention has been described as having a preferred design, it is understood that the invention is capable of further modifications, uses, and/or adaptations which follow in general the principal of the present invention and includes such departures from the present disclosure as come within known or customary practice in the art to which the invention pertains and that may be applied to the central features here and before set forth and fall within the scope of the limits of the appended claims.

We claim:
1. A roadway base intermediate, comprising:
   a) oily sludge; and
   b) steelmaking slag fines.

2. The intermediate of claim 1, wherein:
a) the oily sludge to slag fine ratio is from about 0.5:1 to about 1.5:1.

3. The intermediate of claim 2, wherein:
a) said oily sludge contains up to about 50% by weight water.

4. The intermediate of claim 3, wherein:
a) said steelmaking slag fines contain up to about 50% by weight time.

5. The intermediate of claim 4, wherein:
a) said oily sludge and said steelmaking slag fines having been blended by a high energy shear mixer.

6. The intermediate of claim 5, wherein:
a) said blended oily sludge and steelmaking slag fines having been allowed to react for a period sufficient to cause the water to hydrate the lime.

7. The intermediate of claim 1, further comprising:
a) an additive selected from the group consisting of cement, fly ash, asphaltic emulsion, and mixtures thereof.

8. The intermediate of claim 7, wherein:
a) said cement being present in an amount of from about 0.5 by weight to about 16% by weight, said fly ash being present in an amount of from about 0% by weight to about 16% by weight, and said asphaltic emulsion being present in an amount of from about 0% by weight to about 10% by weight.

9. The intermediate of claim 1, further comprising:
a) at least one pozzolonic binder additive.

10. The intermediate of claim 1, further comprising:
a) at least one pozzolonic binder additive and at least one non-pozzolonic binder additive.

11. A roadway base intermediate, consisting essentially of:
a) oily sludge; and
b) steelmaking slag fines.

12. The intermediate of claim 11, wherein:
a) the ratio of oily sludge to slag fines is from about 0.5:1 to about 1.5:1.

13. The intermediate of claim 12, wherein:
a) said oily sludge contains up to about 50% by weight water, and said slag fines contain up to about 50% by weight lime.

14. The intermediate of claim 13, further comprising:
a) an additive selected from the group consisting of cement, fly ash, asphaltic emulsion, and mixtures thereof.

15. The intermediate of claim 14, wherein:
a) said cement being present in an amount of from about 0 to about 16% by weight, said fly ash being present in an amount of from 0 to about 16% by weight, and said asphaltic emulsion being present in an amount of from 0 to about 10% by weight.

16. A method of preparing a roadway base intermediate, comprising the steps of:
a) providing a supply of water-containing oily sludge;
b) providing a supply of lime-containing steelmaking slag fines;
c) blending the oily sludge with the steelmaking slag fines; and
d) allowing the blended oily sludge and slag fines to react for a period sufficient to hydrate the lime.

17. The method of claim 16, including the step of:
a) providing the oily sludge and the steelmaking slags slag fines in a ratio of from about 0.5:1 to about 1.5:1.

18. The method of claim 17, including the step of:
a) allowing the blended oily sludge and slag fines to react for a period of from about one month to about six months.

19. The method of claim 17, including the step of:
a) adding to the reacted oily sludge and slag fines an additive selected from the group consisting of cement, fly ash, asphaltic emulsion, and mixtures thereof.

20. The method of claim 19, including the step of:
a) providing cement in the range of 0 to about 16% by weight, and/or providing fly ash in the amount of from 0 to about 16% by weight, and/or providing asphaltic emulsion in the range of 0 to about 10% by weight.

21. A roadway base, comprising:
a) oily sludge;
b) steelmaking slag fines; and
c) an additive selected from the group consisting of cement, fly ash, asphaltic emulsion, and mixtures thereof.

22. The base of claim 21, wherein:
a) the ratio of oily sludge to slag fines is from about 0.5:1 to about 1.5:1.

23. The base of claim 22, wherein:
a) the additive when cement is present in an amount of from 0 to about 16% by weight, when fly ash is present in an amount of from 0 to about 16% by weight, and when asphaltic emulsion is present in an amount of from 0 to about 10% by weight.

24. The method of preparing a roadway base, comprising the steps of
a) providing a supply of water-containing oily sludge and a supply of lime-containing steelmaking slag fine.
b) blending the sludge and slag fines;
c) allowing the blended sludge and slag fines to cure for a period sufficient to hydrate the lime; and
d) mixing the hydrated blended sludge and slag fines and an additive selected from the group consisting of cement, fly ash, asphaltic emulsion, and mixtures thereof.

25. The method of claim 24, including the step of:
a) supplying the sludge and slag fines in a ratio of from about 0.5:1 to about 1.5:1.

26. The method of claim 25, including the step of:
a) providing sufficient additive so that the additive when cement is present in an amount of from 0 to about 16% by weight, when fly ash is present in an amount of from about 0 to about 16% by weight, and when asphaltic emulsion is present from 0 to about 10% by weight.

27. The method of claim 25, including the step of:
a) allowing the blended sludge and slag to cure for a period of from about 1 month to about 6 months.

28. The method of claim 25, including the step of:
a) blending the sludge and slag in a high energy shear mixer.

29. The method of claim 28, including the step of:
a) mixing the additive with the blended hydrated sludge and slag in a high energy shear mixture.

* * * * *